US008757650B2

(12) United States Patent
Revelino et al.

(10) Patent No.: US 8,757,650 B2
(45) Date of Patent: Jun. 24, 2014

(54) TRIPLE AXLE WITH RUBBER TORSION MECHANISM

(75) Inventors: Larry Revelino, Norco, CA (US); Leonard Bailey, Seminole, OK (US); Timothy D. Schultz, Mishawaka, IN (US); Emmanuel Camus, Goshen, IN (US)

(73) Assignee: AL-KO Kober A.G., Kötz (DE)

( * ) Notice: Subject to any disclaimer, the term of this patent is extended or adjusted under 35 U.S.C. 154(b) by 28 days.

(21) Appl. No.: 13/396,167

(22) Filed: Feb. 14, 2012

(65) Prior Publication Data

US 2012/0211957 A1    Aug. 23, 2012

Related U.S. Application Data

(60) Provisional application No. 61/444,536, filed on Feb. 18, 2011.

(51) Int. Cl.
*B60G 11/23*    (2006.01)
*B60G 17/00*    (2006.01)

(52) U.S. Cl.
USPC ................. 280/124.169; 280/684; 280/6.159

(58) Field of Classification Search
USPC ...................... 280/124.166, 124.169, 124.11, 280/124.116, 124.128, 124.153, 676, 679, 280/684, 789, 6.159, 6.151, 6.156, 62, 86.5, 280/DIG. 1; 180/24.02, 905, 906
See application file for complete search history.

(56) References Cited

U.S. PATENT DOCUMENTS

| 2,435,199 | A | * | 2/1948 | Buckendale | 280/684 |
| 3,202,440 | A | * | 8/1965 | Apgar, Sr. | 280/686 |
| 3,294,414 | A | * | 12/1966 | Apgar, Sr. | 280/682 |
| 4,813,695 | A | * | 3/1989 | Reid | 280/104 |
| 4,966,386 | A | * | 10/1990 | Werdich | 280/124.13 |
| 5,328,197 | A | * | 7/1994 | Karilainen et al. | 280/406.1 |
| 5,411,287 | A | * | 5/1995 | Henschen | 280/124.169 |
| 5,788,265 | A | * | 8/1998 | McLaughlin | 280/124.169 |
| 6,152,457 | A | * | 11/2000 | Silbernagel | 280/6.151 |
| 6,604,756 | B2 | * | 8/2003 | Simard et al. | 280/676 |
| 6,752,411 | B2 | * | 6/2004 | Few | 280/124.169 |
| 6,905,130 | B2 | * | 6/2005 | Few | 280/124.169 |
| 8,186,697 | B2 | * | 5/2012 | Stephenson et al. | 280/124.166 |
| 8,313,111 | B2 | * | 11/2012 | Ahuja et al. | 280/6.159 |

(Continued)

FOREIGN PATENT DOCUMENTS

EP    0470526 A2    2/1992
EP    0470527 A1    2/1992

(Continued)

*Primary Examiner* — Drew Brown
(74) *Attorney, Agent, or Firm* — Inskeep IP Group, Inc.

(57) ABSTRACT

A preferred embodiment of the present invention includes a triple torsion axle system and kit with various features to help reduce or prevent damage that otherwise may occur with large loads. For example, each axle assembly includes larger diameter caps on the ends of each torsion bar to prevent the bar from pulling out of its outer tube during high side loads. In another example, the outer end of the torsion bar has a rounded surface that is fixed to a swing arm so as to better equalize the stress around the weld joint. Additionally, the triple torsion axle is configured such that when the vehicle is unloaded, the middle axle assembly supports more weight than the two adjacent axle assemblies. However, when the vehicle is loaded, all three axle assemblies provide similar support to the vehicle.

20 Claims, 6 Drawing Sheets

(56) References Cited

U.S. PATENT DOCUMENTS

| | | | |
|---|---|---|---|
| 8,424,888 B2 * | 4/2013 | Ahuja et al. | 280/86.5 |
| 8,448,962 B2 * | 5/2013 | Kalyani et al. | 280/124.101 |
| 2010/0259026 A1 * | 10/2010 | Patmont et al. | 280/124.169 |
| 2013/0062854 A1 * | 3/2013 | Gorrell et al. | 280/124.169 |

FOREIGN PATENT DOCUMENTS

| | | |
|---|---|---|
| EP | 0867314 A2 | 9/1998 |
| EP | 2455275 A2 | 5/2012 |
| WO | WO98/33695 A1 | 8/1998 |
| WO | WO2013/007626 A2 | 1/2013 |

* cited by examiner

US 8,757,650 B2

TRIPLE AXLE WITH RUBBER TORSION MECHANISM

RELATED APPLICATIONS

This application claims priority to U.S. Provisional Application Ser. No. 61/444,536 filed Feb. 18, 2011 entitled Triple Axle With Rubber Torsion Mechanism, which is hereby incorporated herein by reference in its entirety.

BACKGROUND OF THE INVENTION

Torsion axles are used on vehicles, such as trailers, for mounting wheels in order to provide suspension. These torsion axles include a torsion bar coupled to a shock absorbing mechanism which allows the wheel to move vertically in response to variations in terrain. One prior torsion axle design can be seen in U.S. Pat. No. 4,966,386, the contents of which are hereby incorporated by reference.

These torsion axles provide several benefits over commonly used spring axles. For example, their attachment mechanism provides additional strength to the trailer, adjustable (and lower) heights of the trailer, and better shock absorption.

Torsion axles generally work well when used in a single axle application on a trailer. In some circumstances, trailers must support higher loads. Often, additional axles are added to a trailer to support such loads. Double axles also generally work well, but can be subject to higher loads beyond an axle's rating (e.g., climbing a curb or hitting a large pothole). Additional loads can be created during sharp turns with a double axle since the pivot point is typically between both wheels of the double axle.

Triple axles are also possible for supporting very large loads. For example, if a 21,000 lb load must be supported, a trailer may incorporate three 7,000 lb torsion axles. However, the large load is rarely distributed evenly among the axles causing loads far greater than the rate capacity of an individual axle. In addition, the three axle application creates excessive side loads as a trailer performs sharp turns, usually backing, which, as the trailer pivots on the center axle, can scuff or drag the fully loaded front and rear tires across the road surface creating excessive side loads which tend to pull the torsion axle apart and damage wheels and tires. Using standard single axle designs in a three axle combination can lead to performance that is far inferior to that of a single axle. In this invention the three axle application is addressed with a "triple axle system" comprised of three specifically created axles design to work together as a unit in order to provide longer product life, safer product performance, and a smoother ride with loaded as well as unloaded loads.

SUMMARY OF THE INVENTION

A preferred embodiment of the present invention includes a triple torsion axle system and kit with various features to help reduce or prevent damage that otherwise may occur with large loads. For example, each axle assembly includes larger diameter caps on the ends of each torsion bar to prevent the bar from pulling out of its outer tube during high side loads. In another example, the outer end of the torsion bar has a rounded surface that is fixed to a swing arm so as to better equalize the stress around the weld joint.

Additionally, the triple torsion axle is configured such that when the vehicle is unloaded, the middle axle assembly supports more weight than the two adjacent axle assemblies. However, when the vehicle is loaded, all three axle assemblies provide similar support to the vehicle.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
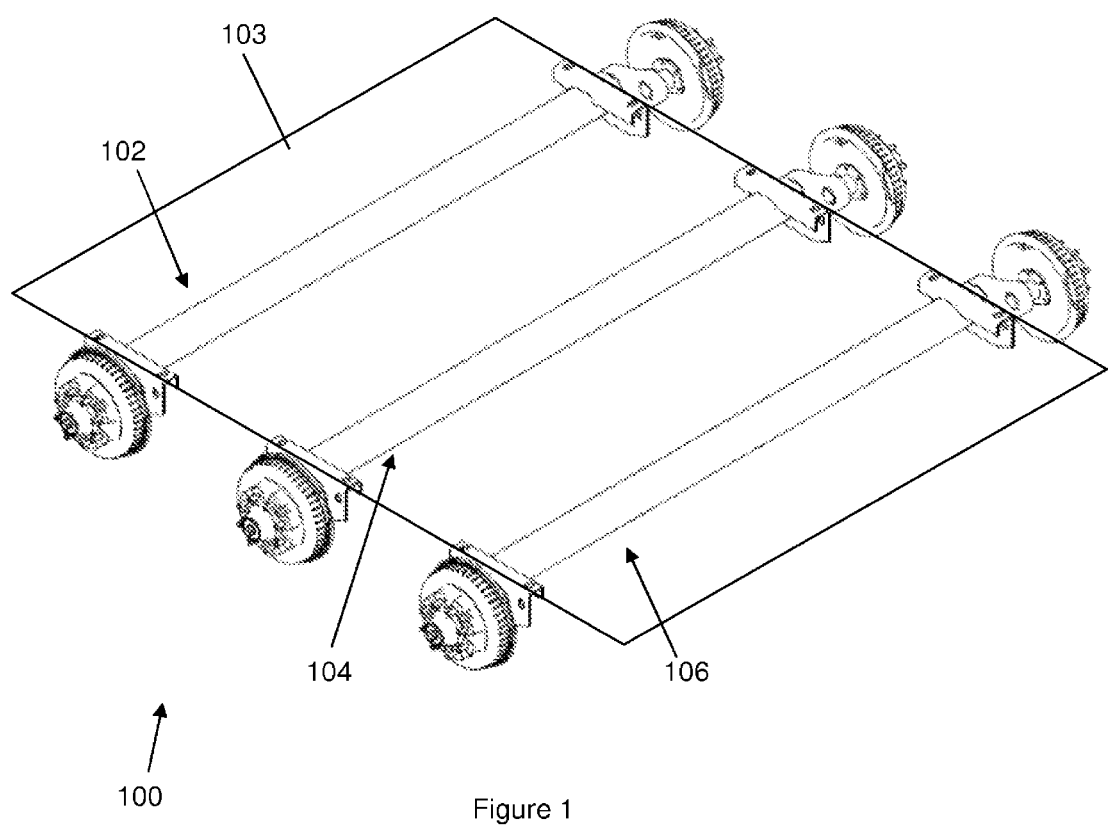
FIG. 1 illustrates a perspective view of a preferred embodiment of a triple axle system on a base of a vehicle.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The term vehicle is used in this specification to mean a motor vehicle (e.g., a car, van or truck) or any wheeled structure that can be towed by a motor vehicle (e.g., a trailer).

Figure 2:
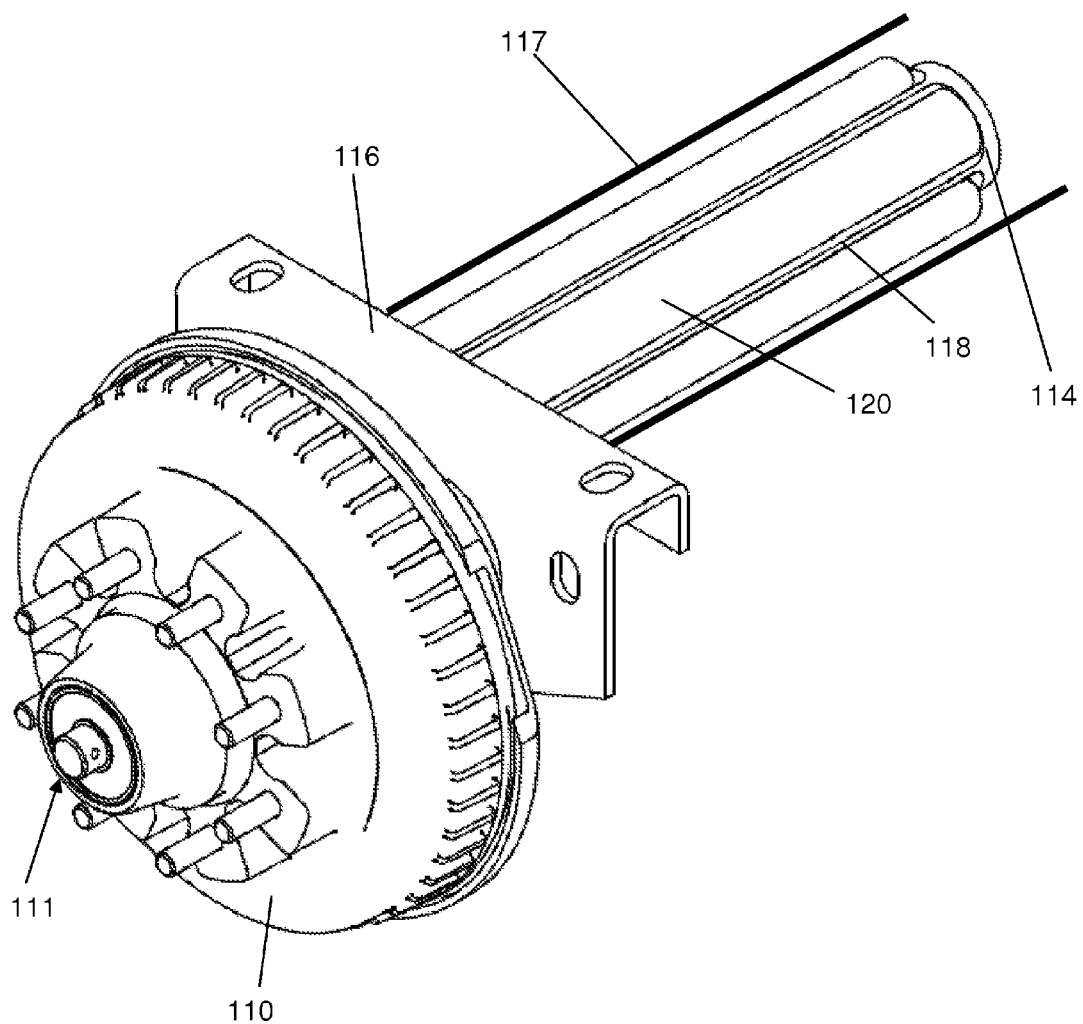
FIG. 2 illustrates a side view of an axle according to the present invention.
Figure 3:
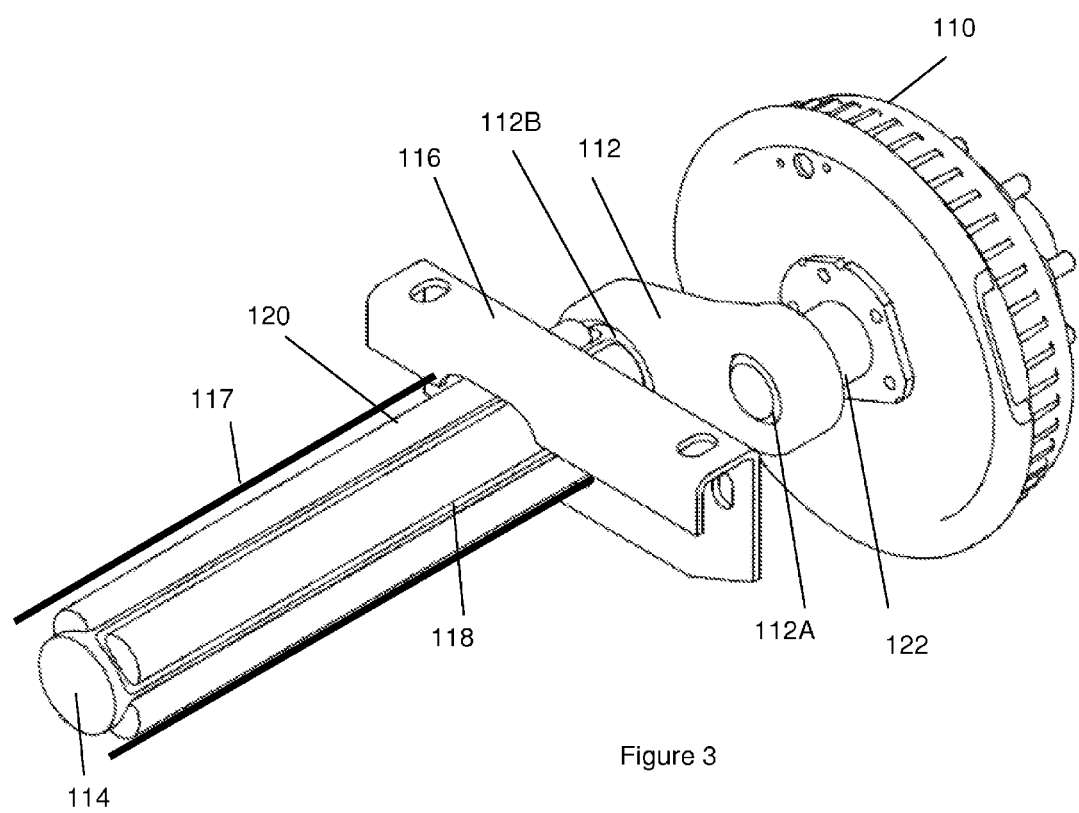
FIG. 3 illustrates a side view of an axle according to the present invention.

FIGS. 1-3 illustrate various views of an improved three-axle assembly 100. The axle assembly 100 includes various features that help reduce or prevent damage that may otherwise occur with large loads on prior axle assembly designs, especially with excessive side loads.

Preferably, the axle assembly 100 includes a back torsion axle 102, a middle torsion axle 104 and a front torsion axle 106. These axles 102, 104, 106 can be sold as a single unit or kit to a trailer or vehicle manufacturers for attachment to a bottom of a vehicle or trailer 103. These axles 102, 104, and 106 can be incorporated into and sold as part of a trailer or vehicle.

Each axle includes a wheel mounting drum 110 for mounting a vehicle wheel (e.g., a wheel hub and rubber tire) via a plurality of threaded bolt members. Each wheel mounting drum 110 includes a bearing assembly 111 to allow the front face of the drum to rotate and a brake (e.g., a drum brake mechanism within the drum 110) to stop the drum 110 from rotation. The back of the drum 110 is coupled to mounting spindle 122 via a mounting plate on one end of the spindle 122 (e.g., via bolts, welding, etc.).

The mounting spindle 122 is fixed (e.g., welded) within an aperture 112A of an elongated swing arm 112 and thereby prevented from rotation. A second end of the swing arm 112 is fixed (e.g., welded) to an inner torsion bar 118 via a second aperture 112B in the swing arm 112. In this respect, as the wheel drum 110 moves up or down, the spindle 122, arm 112, and torsion bar 118 all rotate about a longitudinal axis of the torsion bar 118.

Figure 5:
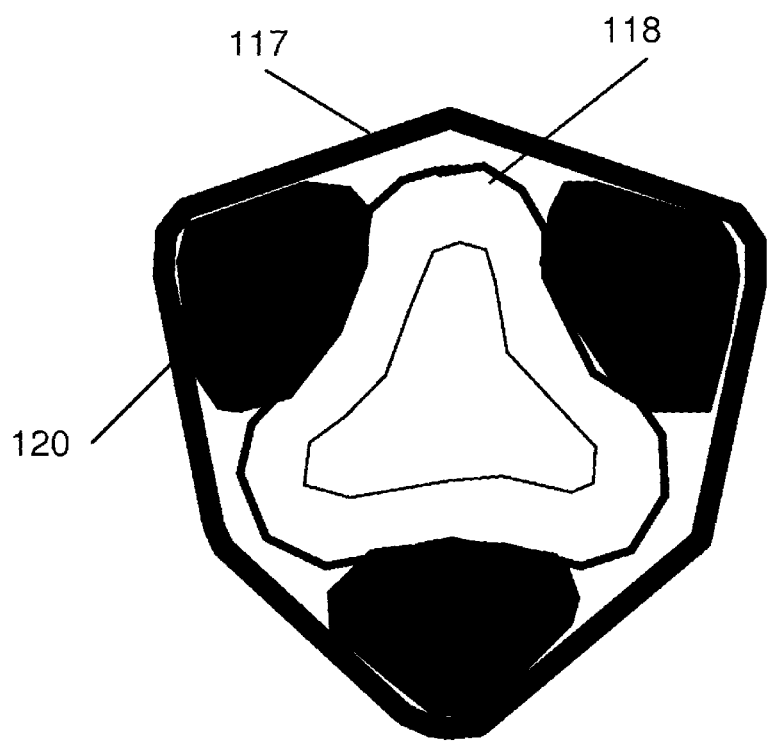
FIG. 5 illustrates a cross sectional view of a torsion bar according to the present invention.

A plurality of elongated shock absorbing members 120 are positioned in spaces or depressions around the diameter of the inner torsion bar 118. Preferably, these spaces are shaped to compliment at least a portion of the shock absorbing members 120 and thereby maintain their position on the torsion bar 118 relative to each other. Exposed surfaces of the shock absorbing members 120 also contact the inner surface of the outer tube 117. In one embodiment seen in FIG. 5, the outer tube 117 has an irregular hexagonal shape as compared with the generally triangular cross sectional shape of the torsion bar 118.

In this respect, the shock absorbing members 120 allow a limited and relatively resilient amount of rotation between the torsion bar 118 and the outer tube 117. Preferably, the shock absorbing members 120 are reduced in size prior to assembly by cooling (e.g., to less than 32° F.) and compression. These compressed members 120 are held in place by the limited space between the torsion bar 118 and the outer tube 117 and expand as the temperature increases.

As the wheel drum 110 moves vertically, it causes the first end of the swing arm 112 (i.e., the end with aperture 112A) to also move vertically. Since the second end of the swing arm 112 (i.e., the end with aperture 112B) is fixed to the inner torsion bar 118, the inner torsion bar 118 rotates. Rotation is limited as the inner torsion bar 118 presses against the shock absorbing members 120, which are engaged with the inner surface of the tube 117. Hence, the shock absorbing members 120 are compressed and further force the inner torsion bar 118 (and therefore the drum 110) in an opposite direction.

Preferably, the center torsion axle 104 is configured to support a higher portion of the load than the back axle 102 or front axle 106. In this respect, when the trailer is unloaded, the center torsion axle 104 supports most of the trailer load, acting more like a single axle trailer. For example, the shock absorbing members 120 of the middle torsion axle 104 may require more force to compress than those of the back axle 102 or front axle 106 (e.g., a higher density rubber or larger length or diameter of rubber). In a specific example, the back axle 102 or front axle 106 may have shock absorbing members 120 of about 1.25 inches (32 mm) in diameter, 16 inches in length and composed of 72 durometer rubber and the middle torsion axle 104 may have shock absorbing members 120 of about 1.25 inches (32 mm) inches in diameter, 20 inches in length and composed of 72 durometer rubber to support a load of at least about 21,000 lb.

The inner torsion bar 118 includes a retention cap 114 having a larger diameter than that of the elongated depressions for the shock absorbing members 120. Preferably, the retention cap 114 has a diameter that is also larger than the cross sectional diameter of the inner torsion bar 118. In other words, the retention cap 114 provides an end wall or abutment surface for the shock absorbing members 120.

Events such as sharp turns can create large side loads on the swing arm 112 and other components. This retention cap 114 creates improved retention of the inner torsion bar and thus creates significantly greater ability to prevent the torsion bar 118 from being pulled out by the relatively high side loads typical in a triple axle configuration. Without the retention cap, the torsion bar 118 could slide out past the shock absorbing members 120 with high enough loads. With the retention cap 114, the entire combination of shock absorbing members 120 as well as the torsion bar must come out together.

In one embodiment, the retention cap 114 is composed of rubber of a similar durometer as the shock absorbing members 120 and is adhered for physically connected to the end of the torsion bar 118. In another embodiment, the retention cap 114 is composed of steel and attached (e.g. welding or bolting) to the inner end of the torsion bar 118.

Figure 4:
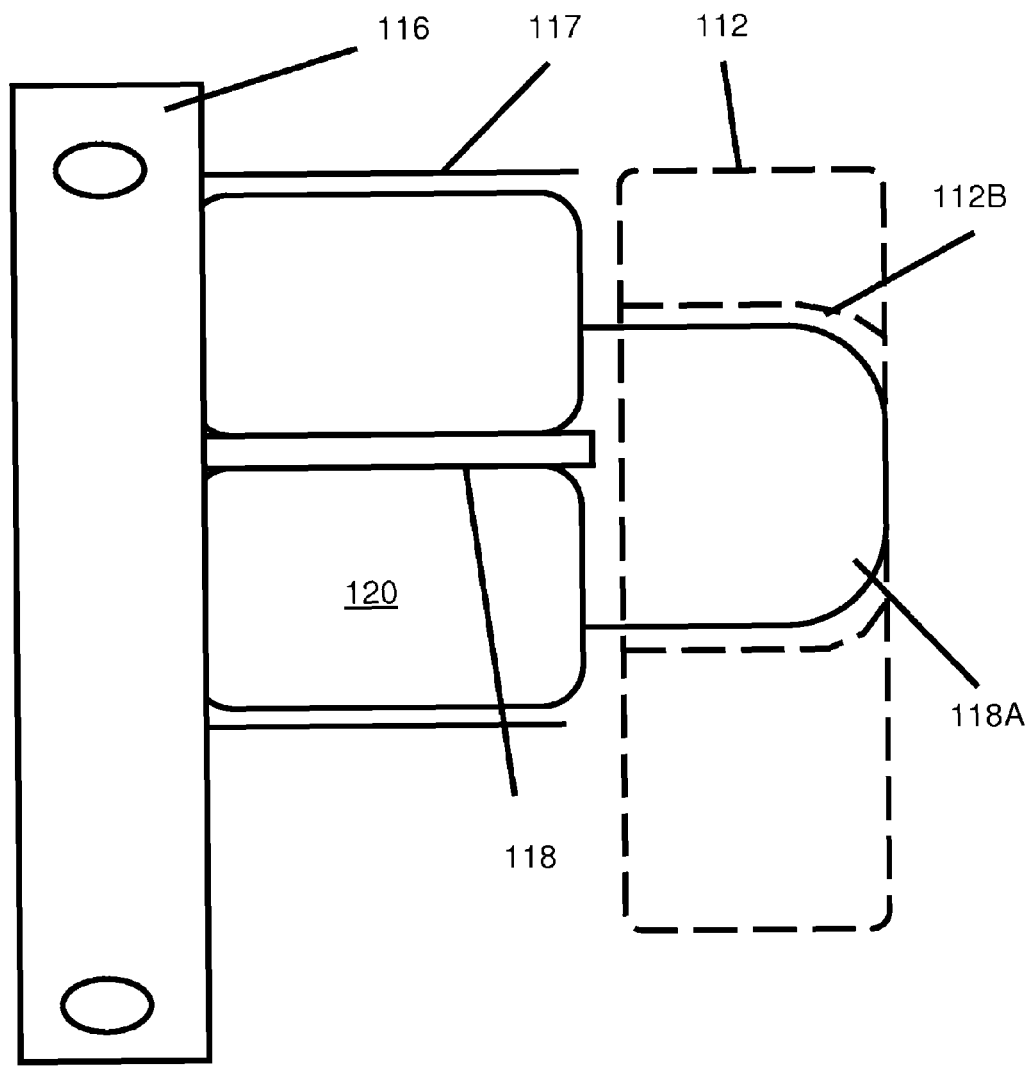
FIG. 4 illustrates a top cut-away view of an axle according to the present invention.

Preferably, the inner torsion bar 118 is rated for and can safely accommodate much higher loads than what would be required for a typical single axle application. For this example, the torsion bar 118 rated for about 10,000 lbs instead of the 7,000 lbs rating that components of single axle trailers are typically rated for. In other words, the inner torsion bar 118 built to withstand higher weight and forces. This higher rating can be achieved, for example, by composing the inner torsion bar 118 of steel and sizing the bar 118 at about 3 inches in diameter. Additionally, as seen in FIG. 4, the outer end 118A of the inner torsion bar 118 is designed more robust than a typical single axle design by having a generally rounded shape that is welded to the aperture 112B of swing arm 112. The round inner torsion bar end equalizes the stress around the weld joint and is press fit thru the aperture 112B of the swing arm 112.

Preferably, the outer tube 117 is also rated higher than the single axle design. In this example the outer tube would be rated for at least about 10,000 lbs. This rating can be achieved, for example, by composing the outer tube 117 of steel with a wall thickness of about 0.375 inches and an overall dimension of about 3.875 inches square.

Preferably, the spindle 122 is rated higher than a single axle design. In this example the spindle 122 is rated for about 8,000 lbs and is cold rolled and its mounting plate is press fit within the back of the drum 110 with a back side weld. The bearings of the drum 110 are also more robust preferably rated for at least about 8,000 lbs and further include 12×2 brakes that are heavier and in this example rated for at least about 8,000 lbs.

Preferably, the back torsion axle 102, the middle torsion axle 104 and the front torsion axle 106 are each attached to the bottom of a vehicle or trailer 103 via two mounting brackets 116. These brackets 116 are preferably coupled around the tube 117 and include apertures to allow bolt/screw/rivet/welding attachment to the bottom of the vehicle or trailer 103.

Preferably, each of the back torsion axle 102, the middle torsion axle 104 and the front torsion axle 106 include a single tube 117 and two of the assemblies of FIGS. 2 and 3 on each end of the tube 117. Alternately, each axle may include two separate, unconnected tubes 117 that are aligned with each other.

Figure 6A:
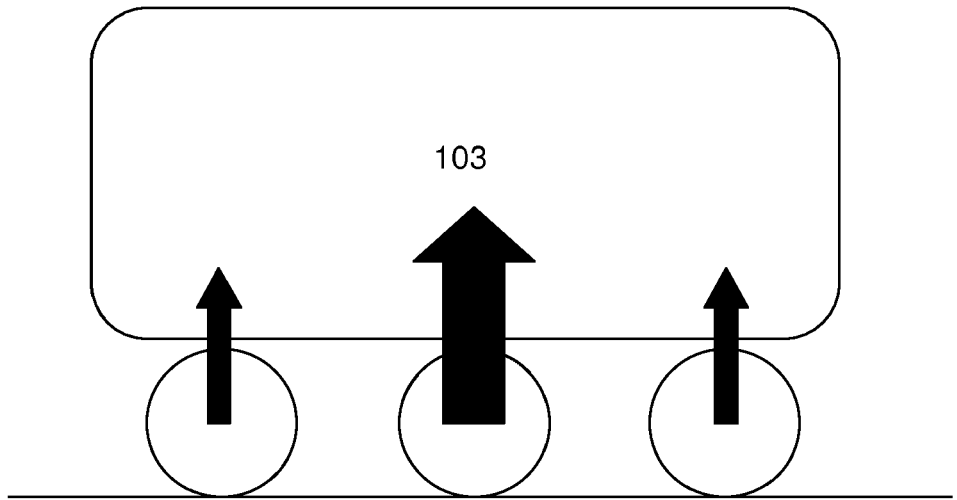
FIGS. 6A and 6B illustrate a vehicle according to the present invention in an unloaded and loaded state.
Figure 6B:
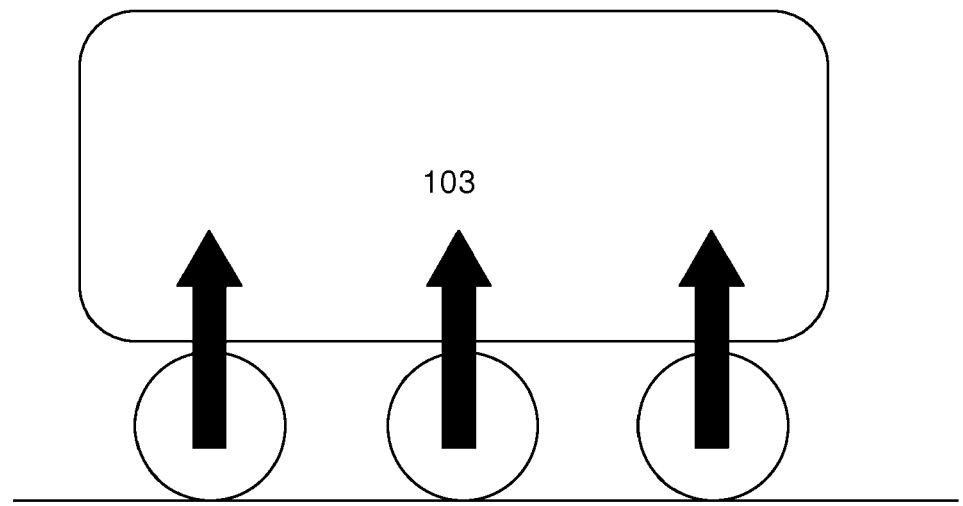

In a preferred embodiment, the elongated shock absorbing members 120 of the assemblies of the middle torsion axle 104 have a larger length than those of the front torsion axle 106 or the back torsion axle 102. In this respect, the middle torsion axle 104 has less "give" and therefore supports most of the weight when the trailer/vehicle is unloaded. This concept can be seen in the representation of the trailer 103 in an unloaded state in FIG. 6A and a loaded state in FIG. 6B. The arrows of these figures demonstrate that more force is supported by the middle torsion axle 104 in the unloaded state as compared with the relatively equal support of the axles in a loaded state. This arrangement allows the trailer/vehicle to act and perform similar to a single axle trailer/vehicle when unloaded but can fully utilize all three axles when loaded with weight.

In one example, the front torsion axle 106 and the back torsion axle 102 have shock absorbing members 120 with lengths of about 16 inches and the middle torsion axle 104 has shock absorbing members 120 with lengths of about 20 inches (e.g., each using 72 durometer rubber). Alternately, the shock absorbing members 120 of the middle torsion axle 104 may have a higher durometer or a larger diameter than the other axles, thereby providing more support.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A triple axle system for a vehicle, comprising:
   a first axle assembly fixed to a bottom of said vehicle;
   a second axle assembly fixed to said bottom of said vehicle; and,
   a third axle assembly fixed to said bottom of said vehicle and located between said first axle assembly and said second axle assembly;
   wherein said third axle assembly provides more support to said vehicle than said first axle assembly and said second axle assembly when said vehicle is unloaded; and,
   wherein said first axle assembly, said second axle assembly, and said third axle assembly provide substantially equal support to said vehicle when loaded.

2. The triple axle system of claim 1, wherein said first axle assembly, said second axle assembly, and said third axle assembly are torsion axles.

3. The triple axle system of claim 2, wherein said first axle assembly, said second axle assembly each include a plurality of elongated shock absorbing members of a first length and said third axle assembly includes a plurality of shock absorbing members of a second length; wherein said second length is larger than said first length.

4. The triple axle system of claim 3, wherein said first length is about 16 inches and said second length is about 20 inches.

5. The triple axle system of claim 4, wherein first axle assembly, said second axle assembly, and said third axle assembly each include two, elongated torsion bars.

6. The triple axle system of claim 5, further comprising a retention cap disposed on an inner end of each of said torsion bars.

7. The triple axle system of claim 6, wherein said retention cap is composed of rubber.

8. The triple axle system of claim 4, wherein said plurality of shock absorbing members of a first and second length are composed of a material having a durometer of about 72.

9. The triple axle system of claim 5, wherein an outer end of each of said torsion bars has a rounded shape and is fixed within a swing arm.

10. A triple axle system kit for a vehicle, comprising:
    a first axle assembly configured for mounting to a bottom of said vehicle;
    a second axle assembly configured for mounting to said bottom of said vehicle; and,
    a third axle assembly configured for mounting to said bottom of said vehicle between said first axle assembly and said second axle assembly;
    wherein said third axle assembly is configured to provide more support to said vehicle than said first axle assembly and said second axle assembly when said vehicle is unloaded; and,
    wherein said first axle assembly, said second axle assembly, and said third axle assembly are configured to provide substantially equal support to said vehicle when loaded.

11. The triple axle system kit of claim 10, wherein said first axle assembly, said second axle assembly, and said third axle assembly are torsion axles.

12. The triple axle system kit of claim 11, wherein said first axle assembly, said second axle assembly each include a plurality of elongated shock absorbing members of a first length and said third axle assembly includes a plurality of shock absorbing members of a second length; wherein said second length is larger than said first length.

13. The triple axle system kit of claim 12, wherein said first length is about 16 inches and said second length is about 20 inches.

14. The triple axle system kit of claim 13, wherein first axle assembly, said second axle assembly, and said third axle assembly each include two, elongated torsion bars.

15. The triple axle system kit of claim 14, further comprising a retention cap disposed on an inner end of each of said torsion bars.

16. The triple axle system kit of claim 14, wherein an outer end of each of said torsion bars has a rounded shape and is fixed within a swing arm.

17. A torsion axle system comprising:
    a tubular member;
    a torsion bar having an inner end located within said tubular member and an outer end located outside of said tubular member;
    a plurality of shock absorbing members positioned along at least a portion of a length of said torsion bar; and,
    a cap member fixed to said inner end of said torsion bar and rotating with said torsion bar within said tubular member; said cap member having a diameter larger than a diameter of said torsion bar.

18. The torsion axle system of claim 17, wherein said cap member is composed of rubber.

19. The torsion axle system of claim 17, wherein said cap member abuts inner ends of said plurality of shock absorbing members.

20. The torsion axle system of claim 17, wherein said cap member is composed of steel.

* * * * *